United States Patent
Kwak et al.

(10) Patent No.: US 9,065,160 B2
(45) Date of Patent: Jun. 23, 2015

(54) RADIANT HEAT PLATE FOR BATTERY CELL MODULE AND BATTERY CELL MODULE HAVING THE SAME

(75) Inventors: Jin Woo Kwak, Gyeonggi-do (KR); Kyong Hwa Song, Seoul (KR); Han Saem Lee, Gyeonggi-do (KR); Byung Sam Choi, Gunpo (KR)

(73) Assignee: Hyundai Motor Company, Seoul (KR)

( * ) Notice: Subject to any disclaimer, the term of this patent is extended or adjusted under 35 U.S.C. 154(b) by 355 days.

(21) Appl. No.: 13/444,096

(22) Filed: Apr. 11, 2012

(65) Prior Publication Data

US 2013/0202924 A1 Aug. 8, 2013

(30) Foreign Application Priority Data

Feb. 8, 2012 (KR) .................. 10-2012-0012849

(51) Int. Cl.
| | |
|---|---|
| H01M 10/50 | (2006.01) |
| H01M 10/6555 | (2014.01) |
| H01M 10/613 | (2014.01) |
| H01M 10/653 | (2014.01) |
| H01M 10/6551 | (2014.01) |
| H01M 10/6561 | (2014.01) |

(52) U.S. Cl.
CPC ...... *H01M 10/5055* (2013.01); *H01M 10/5004* (2013.01); *H01M 10/504* (2013.01); *H01M 10/5046* (2013.01); *H01M 10/5063* (2013.01)

(58) Field of Classification Search
USPC ...................................... 429/81, 120; 165/185
See application file for complete search history.

(56) References Cited

U.S. PATENT DOCUMENTS

| | | | | |
|---|---|---|---|---|
| 5,381,859 | A * | 1/1995 | Minakami et al. | 165/80.3 |
| 2007/0184229 | A1* | 8/2007 | Jeong | 428/40.1 |
| 2008/0090137 | A1 | 4/2008 | Buck et al. | |
| 2011/0212355 | A1* | 9/2011 | Essinger et al. | 429/120 |
| 2012/0315407 | A1* | 12/2012 | Mazany et al. | 428/12 |
| 2013/0164578 | A1* | 6/2013 | Sweet et al. | 429/82 |

FOREIGN PATENT DOCUMENTS

| | | |
|---|---|---|
| JP | 2006176766 A | 7/2006 |
| JP | 2011034821 A | 2/2011 |
| KR | 10-2003-0061974 | 7/2003 |
| KR | 10-2008-0078625 | 8/2008 |
| KR | 10-2011-0112716 | 2/2010 |
| KR | 1020100017043 * | 2/2010 |
| KR | 10-2011-0055008 | 5/2011 |
| KR | 10-2010-0017043 | 10/2011 |
| WO | 2011/048916 A1 | 4/2011 |

* cited by examiner

*Primary Examiner* — Cynthia H Kelly
*Assistant Examiner* — Monique Wills
(74) *Attorney, Agent, or Firm* — Mintz Levin Cohn Ferris Glovsky and Popeo, P.C.; Peter F. Corless

(57) ABSTRACT

Disclosed is a radiant heat plate and a battery cell module having the same. The radiant heat plate is interposed between battery cells. The radiant heat plate includes a high-thermal conductivity plate with excellent thermal conductivity and a composite sheet fixedly laminated on both surfaces of the high-thermal conductivity plate. Here, the composite sheet is formed of a thermoplastic elastomer composite filled with a high-thermal conductivity filler.

16 Claims, 6 Drawing Sheets

<AFTER PRIMARY HIGH
-TEMPERATURE PRESSING PROCESS>

<AFTER SECONDARY HIGH
-TEMPERATURE PRESSING PROCESS>

RADIANT HEAT PLATE FOR BATTERY CELL MODULE AND BATTERY CELL MODULE HAVING THE SAME

CROSS-REFERENCE TO RELATED APPLICATION

This application claims under 35 U.S.C. §119(a) the benefit of Korean Patent Application No. 10-2012-0012849 filed Feb. 8, 2012, the entire contents of which are incorporated herein by reference.

BACKGROUND (a) Technical Field

The present invention relates to a radiant heat plate and a battery cell module having the same. More particularly, it relates to a radiant heat plate and a battery cell module having the same, which can deal with the volume change of a battery cell and can effectively radiate heat accumulated in the battery cell module.

(b) Background Art

Generally, local temperature differences and high temperatures may occur in batteries of electric vehicles due to the amount of heat generated by the battery's high-output, high-speed, and repetitive charging and discharging, causing thermal runaway that hinders the efficiency and stability of batteries. The thermal runaway results from deficiency of heat radiation and diffusion capacity to the outside of the batteries compared to heat generated within batteries.

Lithium secondary batteries, which have a working voltage of about 3.6 V or more, are being used as power sources for portable electronics, and in high-power hybrid vehicles by being connected in series to each other. The lithium secondary batteries have a working voltage three times higher than that of nickel-cadmium batteries or nickel-metal hybrid batteries, and have a better energy density per unit weight as well.

Various types of lithium secondary batteries can be manufactured. Recent lithium secondary batteries of a pouched type with flexibility are relatively flexible in in shape and therefore are ideal in automotive applications.

Battery cells constituting a typical pouched-type lithium secondary battery include a battery part and a pouched-type case having a space receiving the battery part. The battery part includes an anode plate, a separator, and a cathode plate that are sequentially disposed and wound in one direction, or includes a plurality of anode plates, separators, and cathode plates stacked in a multi-layered structure. Also, the case can be flexibly bent due to its excellent formability.

The pouched-type battery cells may vary in volume due to intercalation/deintercalation of lithium ions to/from electrode material during charging/discharging as discussed in *Journal of Power Sources*, by J. H. Lee et al. 119-121 (2003) 833-837 which is hereby incorporated by reference in its entirety.

The damage of the separator due to expansion of the electrode plate in the battery cell incurs generation of internal resistance, increase of voltage, and reduction of battery capacity. Also, when the volume of a battery cell in a typical battery system increases, a channel formed between two battery cells in a battery cell unit decreases in size, reducing the cooling effect rather than a channel formed between modules. Accordingly, heat generation between battery cells due to rising temperatures of adjacent battery cells is accelerated. This causes a rapid reduction in the battery performance as a result.

In addition, when the volume expansion of the battery cell is severe, the case may be damaged thereby causing leakage of the electrolyte and gas from inside the battery. Furthermore, since the battery cell module is structured by stacking a plurality of battery cells (or unit cells), the volume expansion of the battery cell, gas leakage, or even explosion of a cell may cause damage to the cells surrounding it.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a radiant heat plate and a battery cell module having the same, which is an interface plate disposed between battery cells of a pouched-type battery cell module, and can deal effectively with the volume change of the battery cell and radiate heat accumulated in the battery cell module.

In one aspect, the present invention provides a radiant heat plate for a battery cell module, interposed between battery cells. The radiant heat plate is made up of a high-thermal conductivity plate with excellent thermal conductivity properties and a composite sheet fixedly laminated on both surfaces of the high-thermal conductivity plate. The composite sheet is formed of a thermoplastic elastomer composite filled with a high-thermal conductivity filler.

In an exemplary embodiment of the present invention, the high-thermal conductivity plate may be improved in an interfacial adhesion with the composite sheet by applying an alkali-acid pretreatment to the surface of the high-thermal conductivity plate.

In another exemplary embodiment, the high-thermal conductivity plate may have a plurality of apertures that are formed at predetermined intervals to increase an adhesive strength with the composite sheet.

In still another exemplary embodiment, the high-thermal conductivity plate may include a radiant heat fin on both edges thereof. The radiant heat fin may protrude toward an air channel between unit battery cell modules and may be formed (or protruded) perpendicular to a flow direction of cooling air in the air channel.

In some exemplary embodiments, the high-thermal conductivity plate may be formed of an aluminum material with excellent thermal conductivity (e.g., 250 W/mk or more).

In a further exemplary embodiment, the high-thermal conductivity filler may be one of graphite, carbon black, boron nitride, carbon fiber, silicon carbide, aluminum nitride, and a combination thereof.

In another further exemplary embodiment, the thermoplastic elastomer material may be one of thermoplastic polyurethane (TPU) and styrene-ethylene-butylene-styrene (SEBS).

In still another further exemplary embodiment, the composite sheet may be formed to have a thickness of about 0.5 mm to about 0.7 mm to allow effective heat transfer and volume change. The composite sheet may have a thermal conductivity of about 10 W/mK or more.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
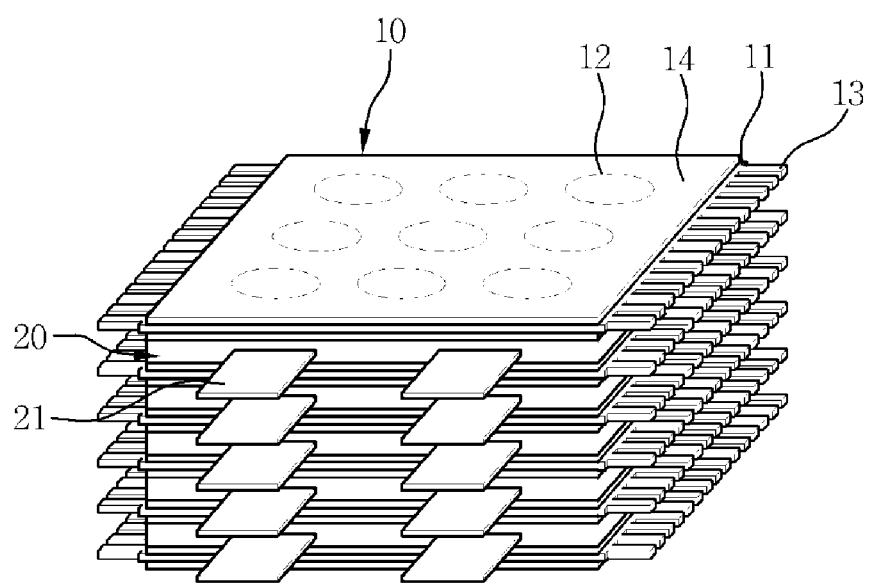
FIG. 1 is a perspective view illustrating a battery cell module including a radiant heat plate according to an exemplary embodiment of the present invention.

Reference numerals set forth in the Drawings includes reference to the following elements as further discussed below:

10,10': radiant heat plate
11,11': high-thermal conductivity plate
12,12': punched aperture
13,13': radiant heat fin
14,14': composite sheet
20: battery cell
21: electrode part It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described will be described in detail with reference to the accompanying drawings.

A radiant heat plate according to an exemplary embodiment of the present invention, which is a heat controlling component for a battery cell module, may have a material and a structure that can effectively radiate heat generated in a battery cell module, in order to secure the lifespan and the stability of a battery and battery package. Also, the radiant heat plate may be elastic in nature to absorb volumetric changes of a battery cell generated by charging and discharging, in order to achieve compact battery heat radiation system design for improving energy density versus volume.

Thus, the radiant heat plate may be interposed between pouched-type battery cells, and may be repetitively compressed and restored during charging and discharging to deal with the volumetric changes of the battery cell. The radiant heat plate may have a structure that can maximize the heat radiation characteristics using a material with excellent thermal conductivity.

Figure 2:
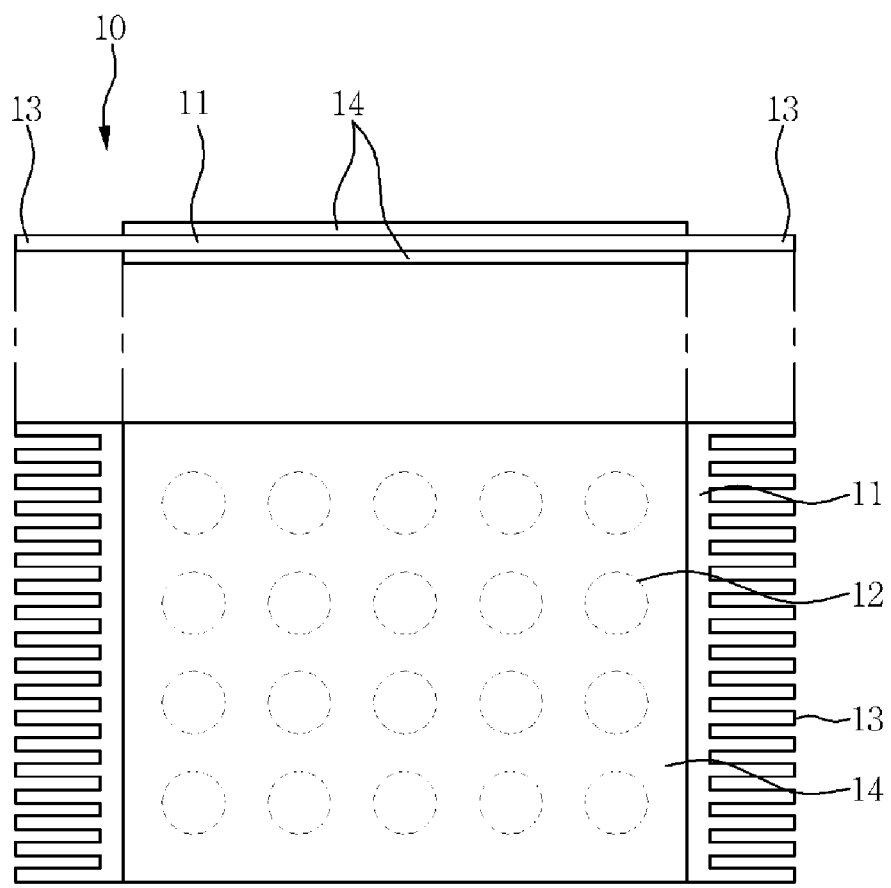
FIG. 2 is a view illustrating a radiant heat plate for a battery cell module according to an exemplary embodiment of the present invention.

As shown in FIGS. 1 and 2, a radiant heat plate 10 according to an embodiment of the present invention, which is an interface component for heat radiation interposed between battery cells 20 of a battery cell module, may include a flat high-thermal conductivity plate 11 and a composite sheet 14 laminated on both surfaces of the high-thermal conductivity plate 11. The high-thermal conductivity plate 11 may be formed of a material with excellent thermal conductivity, for example, aluminum. The composite sheet 14 may be formed in a flat and thin sheet-type in which a composite material including thermoplastic elastomer and high-thermal conductivity filler with excellent thermal conductivity, i.e., Thermoplastic elastomer (TPE) composite filled with high thermal-conductivity filler is pressed on the high-thermal conductivity plate 11. The TPE composite may be attached on the high-thermal conductivity plate 11 via a press forming method.

In this case, alkali-acid pretreatment may be performed on the high-thermal conductivity plate 11 to increase interfacial adhesive strength with the composite sheet (matrix resin of composite sheet, i.e., thermoplastic elastomer material) 14. During the pretreatment, an oxide layer and impurities may be removed from the surface of the high-thermal conductivity plate 11, and the surface roughness is therefore increased.

As shown in FIG. 2, in order to achieve macro interlocking for increasing the adhesive strength with the composite sheet (matrix resin of composite sheet, i.e., thermoplastic elastomer material) 14, the high-thermal conductivity plate 11 may have a plurality of apertures 12 that are arranged at predetermined intervals. The high-thermal conductivity plate 11 may be patterned with the array of the apertures 12 of certain size and iterated to allow the composite sheets 14 attached on both surfaces of the high-thermal conductivity plate 11 to be attached to each other through the punched aperture 12. Thus, the adhesive strength with the composite sheet 14 can be increased, thereby preventing filling-out of the composite sheet 14.

The radiant heat plate 10 structured by laminating the composite sheet 14 on the both surfaces of the high-thermal conductivity plate 11 may be interposed between the battery cells 20 to deal with the volumetric changes generated during charging and discharging of the battery using the elasticity of the elastomer material. Also, since there is no interfacial gap with the battery cell 20 due to the "gripping" property of the elasticity of the elastomer material, heat can be effectively transferred to the high-thermal conductivity plate 11 through the elastomer composite (or high-thermal conductivity filler containing elastomer composite). By gripping property it is meant the elastomer's ability to stay attached to an adjacent structure.

The high-thermal conductivity plate 11 may include a radiant heat fin 13 at both edges thereof, in order to effectively radiate internal heat of the battery transferred through the composite sheet 14, i.e., the elastomer composite containing the high-thermal conductivity filler. The radiant heat fin 13, effectively a heat sink, may increase the specific surface area at the edge of the high-thermal conductivity plate 11 to improve the heat radiation performance by air cooling.

Figure 3:
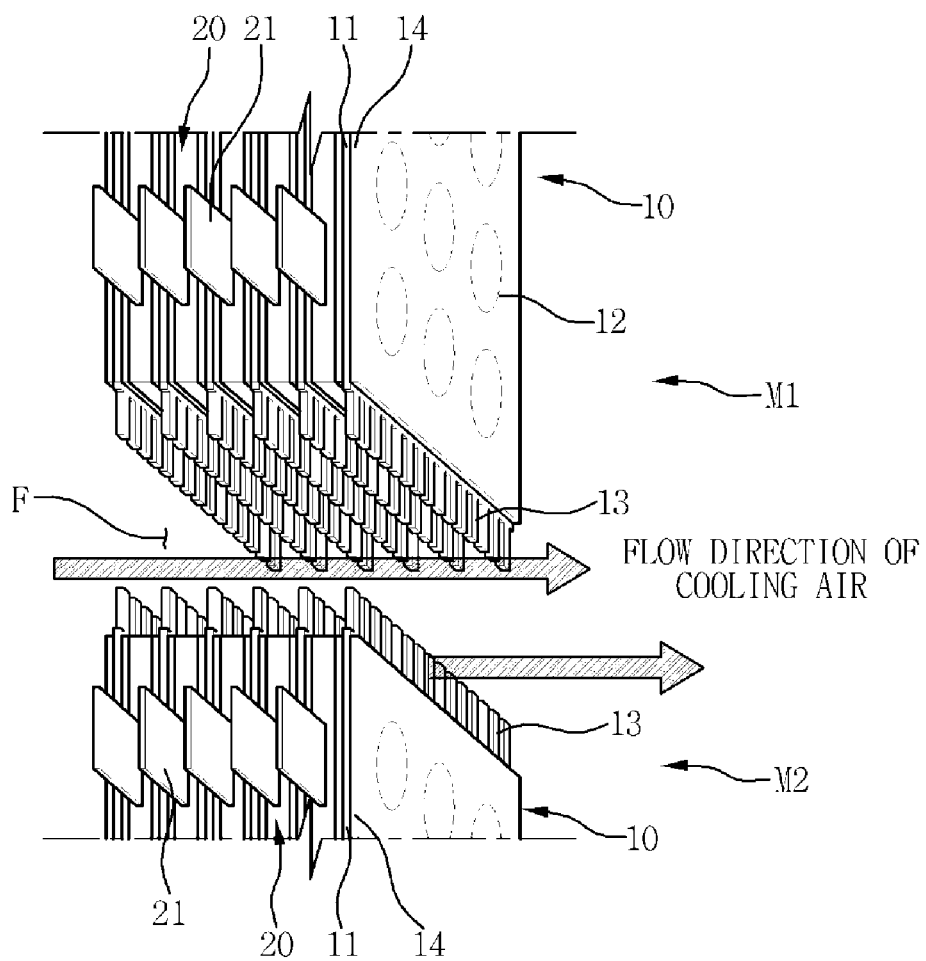
FIG. 3 is a view illustrating an air channel formed between battery cell modules according to an exemplary embodiment of the present invention.

As shown in FIGS. 1 and 3, the radiant heat fin 13 may be disposed at the both edges of the high-thermal conductivity plate 11 to avoid the electrode part 21 of the battery cell 20 when the radiant heat plate 10 is interposed between the battery cells 20. Also, the radiant heat fin 13 may protrude toward an air channel F that is formed between unit battery cell modules M1 and M2 in a battery pack unit including a plurality of unit battery cell modules M1 and M2.

Thus, heat inside the battery cell modules M1 and M2 may be transferred to the high-thermal conductivity plate 11 through the elastomer composite (or high-thermal conductivity filler containing elastomer composite) of the composite sheet 14, and may be diffused into the radiant heat fin(s) 13 along the temperature gradient to be radiated from the radiant heat fin 13 by cooling air between the unit battery cell modules M1 and M2.

The radiant heat fin 13 may be disposed perpendicular to the flow direction of the cooling air in the air channel F formed between the unit battery cell modules M1 and M2. The air channel F may be formed between the unit battery cell modules M1 and M2 to be perpendicular to the radiant heat fin 13. Thus, the flow direction of the cooling air in the air channel F may become perpendicular to the radiant heat fin 13, thereby achieving effective heat radiation by convection.

The high-thermal conductivity filler of the composite sheet 14 for transferring internal heat of the battery to the radiant heat fin 13 may include a material with excellent thermal conductivity, for example, one of graphite, carbon black, boron nitride, carbon fiber, silicon carbide, aluminum nitride, and a combination thereof. For example, graphite with thermal conductivity of about 100 W/mK to about 200 W/mK may be used. In this case, the elastomer composite filled with the high-thermal conductivity filler may have a thermal conductivity of about 10 W/mK or more.

A composite sheet manufacture with the elastomer composite filled with the high-thermal conductivity filler may have a thermal conductivity of about 10 W/mK or more. The matrix material of the composite sheet 14, i.e., thermoplastic elastomer material may include one of thermoplastic polyurethane (TPU) and styrene-ethylene-butylene-styrene (SEBS). The composite sheet 14 preferably has a thickness thin enough to perform effective heat transfer on the high-thermal conductivity plate 11, and appropriate to show elasticity for dealing with the improvement of gripping property and the volumetric changes. The composite sheet 14 may have a thickness of about 0.5 mm to about 0.7 mm to allow effective heat transfer and volume change. Thus, since the radiant heat plate 10 is interposed between the battery cells 20, and absorbs the volumetric change of the battery cell 20 and performs effective heat radiation, the whole battery system can be maintained at the optimum temperature.

Figure 4:
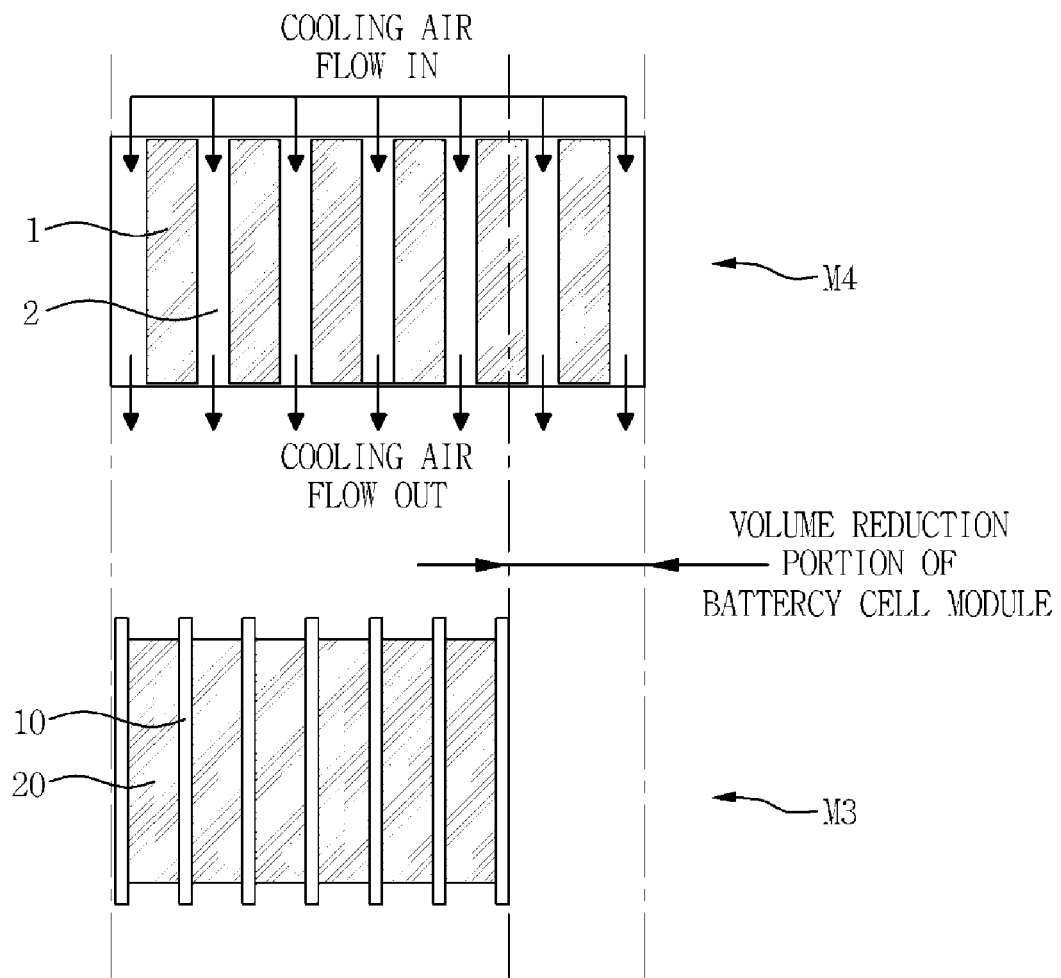
FIG. 4 is a view illustrating a comparison between a typical battery cell module and a battery cell module according to an exemplary embodiment of the present invention.

Referring to FIG. 4, in a heat radiation system using a typical battery cell module M4, the design flexibility is limited because pouched-type battery cells 1 are arranged at a certain interval of about 3 mm to about 5 mm to form an air channel 2 for air cooling. However, in a heat radiation system using the battery cell module M3 including the radiant heat plate 10 according to the exemplary embodiment of the present invention, since the interval between the battery cells 20 can be reduced to about 3 mm or less corresponding to the thickness of the radiant heat plate 10 without a separate channel space for air cooling, energy density versus equal volume can be increased.

The radiant heat plate 10 may be manufactured using an apparatus shown in FIG. 5, a detailed description of which will be made below. A sheet of aluminum plate with width of about 190 mm and height (thickness) of about 1 mm may be prepared. Both edges in the width direction may be processed to continuously forming an array of radiant heat fins 13' with length of about 30 mm and thickness of about 10 mm to about 12 mm. An interval between radiant heat fins 13' may range about 10 mm to about 12 mm.

Figure 6:
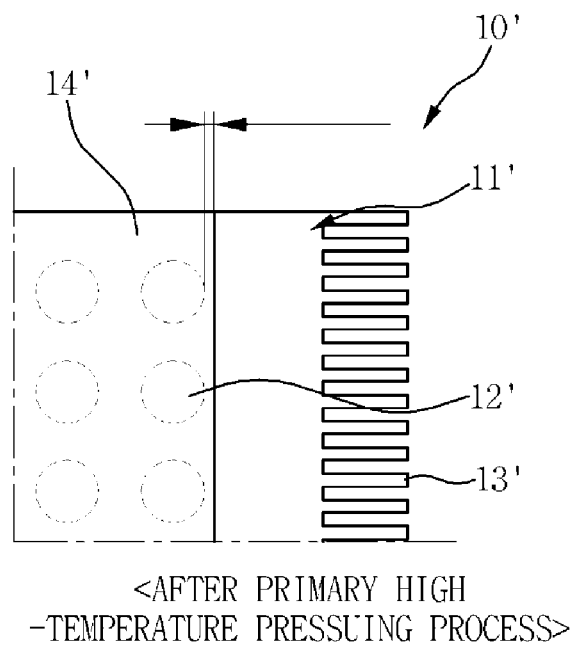
FIG. 6 is a view illustrating a partial process for manufacturing a radiant heat plate according to an exemplary embodiment of the present invention.
Figure 6:
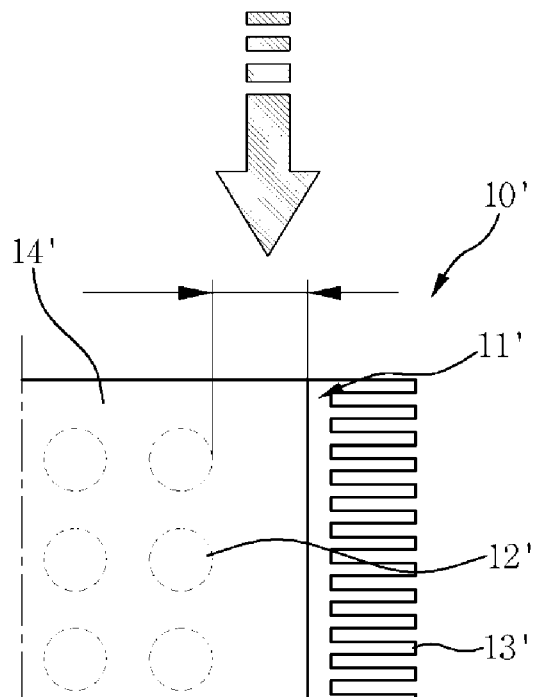

Next, apertures 12' having a diameter of about 18 mm to about 20 mm may be formed at the inner side of the radiant heat fin 13' using a punching machine. The apertures 12' may be formed at intervals of about 20 mm to about 24 mm in the horizontal direction and about 20 mm to about 22 mm in the vertical direction (see 11 of FIG. 2 and 11' of FIG. 6). Thereafter, dusts and organic contaminants may be removed from the surface of the processed aluminum plate (11' of FIG. 6) using ethanol and acetone. The aluminum plate may be pre-etched in about 5% NaOH solution for about 4 to 6 minutes and dipped in about 30% $HNO_3$ solution (bath), and then may be washed with running water.

Figure 5:
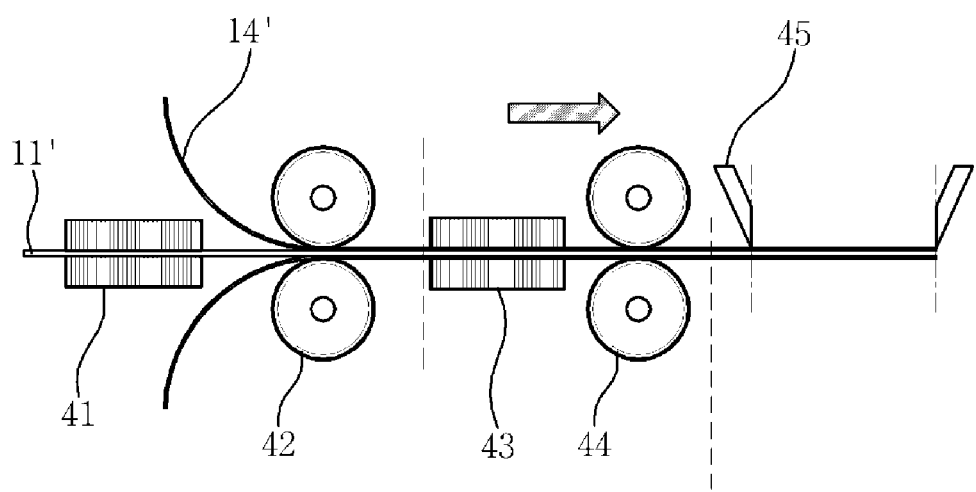
FIG. 5 is a view illustrating equipment for manufacturing a radiant heat plate according to an exemplary embodiment of the present invention.

The aluminum plate 11' having undergone the above surface pretreatment twice may be passed and heated through an infrared preheater 41 of about 160° C. to about 200° C. as shown in FIG. 5, and then a flat type of TPE sheet 14' may be attached to both surfaces of the aluminum plate 11' by an adhesion roller 42. In this case, the TPE sheet 14' may be prepared in a size that can cover all the apertures 12' formed in the aluminum plate 11'. As shown in the left drawing of FIG. 6, the TPE sheet 14' may further extend from the aperture 12' by about 1 mm to about 2 mm.

The TPE sheet 14' attached on the aluminum plate 11 may be again heated by an Infrared (IR) preheater 43, and then pressed by a pressing roller 44 to form a radiant heat plate 10'. Through the above high-temperature pressing process, the TPE sheet 14' may be elongated closely to the radiant heat fin 13' as shown in the right drawing of FIG. 6. Finally, the aluminum plate 11' attached with the TPE sheet 14' may be cut into a certain length by a cutter 45 to finish the radiant heat plate 10'.

A radiant heat plate for a battery cell according to the exemplary embodiment of the present invention can be disposed between battery cells to effectively radiate heat accumulated in a battery and absorb volumetric changes during the charging and discharging of the battery cell. Thus, a battery cell using the radiant heat plate according to the exemplary embodiment of the present invention improves heat radiation performance, and provides a compact heat-radiating system with improved energy density versus volume. Also, the lifespan of a battery is prolonged, and the stability is ensured.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A radiant heat plate for a battery cell module, interposed between battery cells, the radiant heat plate comprising:
   a thermal conductivity plate with a high degree of thermal conductivity; and
   a pair of composite sheets fixedly attached to the thermal conductivity plate, wherein the composite sheet is formed of a thermoplastic elastomer composite filled with a thermal conductivity filler,
   wherein the thermal conductivity plate has a plurality of apertures formed at predetermined intervals and both surfaces of the thermal conductivity plate are etched by an alkali-acid pretreatment,
   wherein the composite sheets are attached to the etched surfaces of thermal conductivity plate,
   wherein the pair of composite sheets are attached to each other through the apertures.

2. The radiant heat plate of claim 1, wherein the thermal conductivity plate comprises a radiant heat fin at both edges thereof, and the radiant heat fin protrudes toward an air channel between unit battery cell modules.

3. The radiant heat plate of claim 2, wherein the radiant heat fin is perpendicular to a flow direction of cooling air in the air channel.

4. The radiant heat plate of claim 1, wherein the thermal conductivity plate is formed of an aluminum material.

5. The radiant heat plate of claim 1, wherein the thermal conductivity filler includes one of graphite, carbon black, boron nitride, carbon fiber, silicon carbide, aluminum nitride, and a combination thereof.

6. The radiant heat plate of claim 1, wherein the thermoplastic elastomer material comprises one of thermoplastic polyurethane (TPU) and styrene-ethylene-butylene-styrene (SEBS).

7. The radiant heat plate of claim 1, wherein the composite sheet is formed to have a thickness of about 0.5 mm to about 0.7 mm to allow effective heat transfer and volume change.

8. The radiant heat plate of claim 1, wherein the composite sheet has a thermal conductivity of about 10 W/mK or more.

9. A battery cell module comprising:
   a plurality of battery cells; and
   a radiant heat plate interposed between the battery cells, wherein the radiant heat plate includes a thermal conductivity plate with thermal conductivity and a pair of composite sheets fixedly attached to the thermal conductivity plate, and the composite sheet is formed of a thermoplastic elastomer composite filled with a thermal conductivity filler,
   wherein the thermal conductivity plate has a plurality of apertures formed at predetermined intervals and both surfaces of the thermal conductivity plate are etched by an alkali-acid pretreatment,
   wherein the composite sheets are attached to the etched surfaces of thermal conductivity plate,
   wherein the pair of composite sheets are attached to each other through the apertures.

10. The battery cell module of claim 9, wherein the thermal conductivity plate comprises a radiant heat fin at both edges thereof, and the radiant heat fin protrudes toward an air channel between unit battery cell modules.

11. The battery cell module of claim 10, wherein the radiant heat fin is perpendicular to a flow direction of cooling air in the air channel.

12. The battery cell module of claim 9, wherein the thermal conductivity plate is formed of an aluminum material.

13. The battery cell module of claim 9, wherein the thermal conductivity filler includes one of graphite, carbon black, boron nitride, carbon fiber, silicon carbide, aluminum nitride, and a combination thereof.

14. The battery cell module of claim 9, wherein the thermoplastic elastomer material comprises one of thermoplastic polyurethane (TPU) and styrene-ethylene-butylene-styrene (SEBS).

15. The battery cell module of claim 9, wherein the composite sheet is formed to have a thickness of about 0.5 mm to about 0.7 mm to allow effective heat transfer and volume change.

16. The battery cell module of claim 9, wherein the composite sheet has a thermal conductivity of about 10 W/mK or more.

* * * * *